United States Patent [19]

Mihara et al.

[11] Patent Number: 4,562,344

[45] Date of Patent: Dec. 31, 1985

[54] AUTOMATIC FOCUS DETECTING MECHANISM FOR ENDOSCOPES

[75] Inventors: Shin-ichi Mihara; Toshihiro Imai; Ken-ichi Nakahashi; Youichi Iba; Masaki Imaizumi; Akio Taira, all of Hachiouji, Japan

[73] Assignee: Olympus Optical Co., Ltd., Tokyo, Japan

[21] Appl. No.: 445,989

[22] Filed: Dec. 1, 1982

[30] Foreign Application Priority Data

Dec. 2, 1981 [JP] Japan .................................. 56-194021

[51] Int. Cl.⁴ .............................................. G01J 1/20
[52] U.S. Cl. ...................................... 250/201; 250/227
[58] Field of Search ............... 250/201, 204, 209, 227; 350/96.26; 356/4–5

[56] References Cited

U.S. PATENT DOCUMENTS 4,153,834   5/1979   Hayamizu ..................... 250/201 AF
4,340,811   7/1982   Yamashita et al. ........... 250/201 AF Primary Examiner—David C. Nelms
Assistant Examiner—J. Jon Brophy
Attorney, Agent, or Firm—Cushman, Darby & Cushman

[57] ABSTRACT

An endoscope provided with a light receiving device on the eyepiece side in respect of an image guide and with a driving means for moving an objective lens near an eyepiece, to make the whole endoscope slim and to make it simple in formation despite its being provided with an automatic focus detecting mechanism.

6 Claims, 5 Drawing Figures

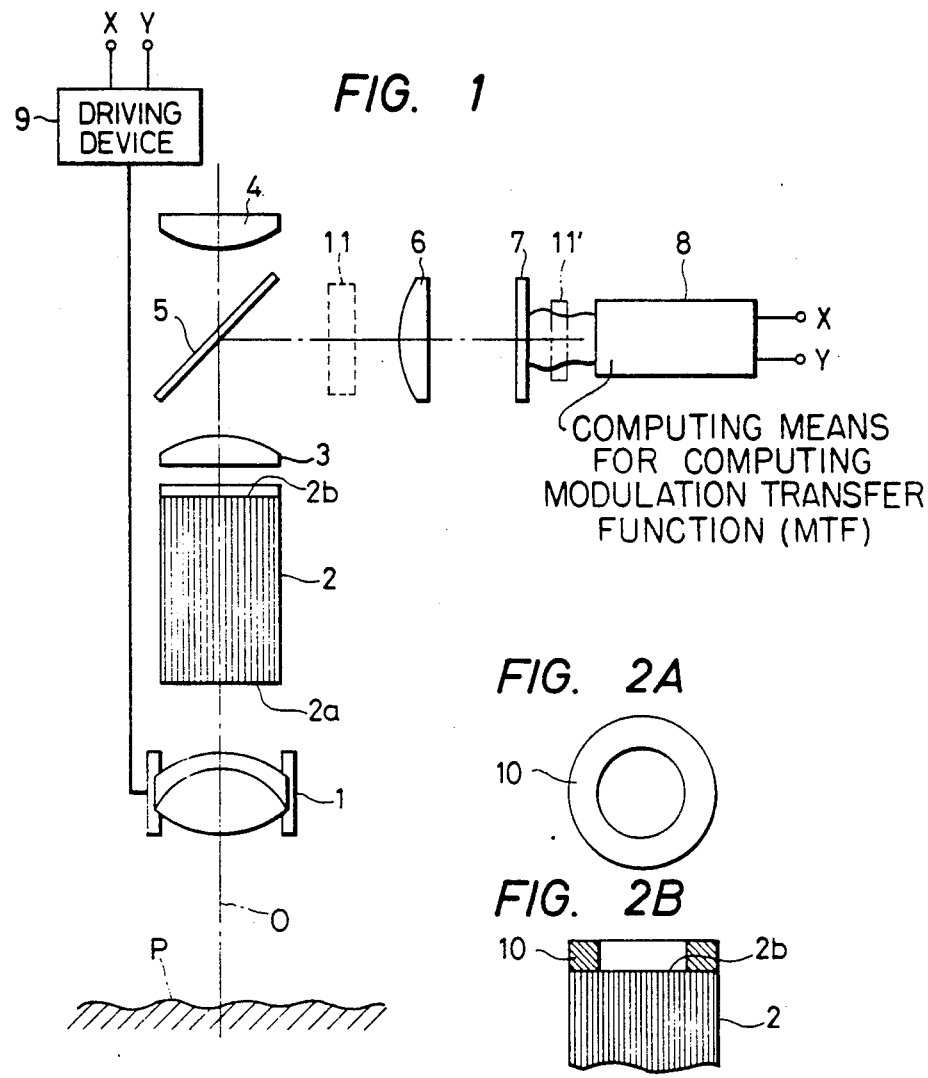
FIG. 1
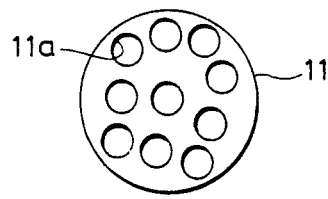
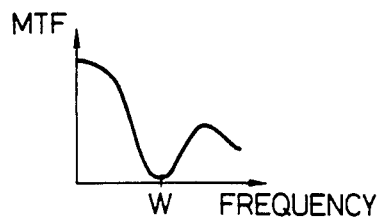

AUTOMATIC FOCUS DETECTING MECHANISM FOR ENDOSCOPES

BACKGROUND OF THE INVENTION (a) Field of the Invention

This invention relates to an endoscope and more particularly to an automatic focus detecting mechanism for endoscopes.

(b) Description of the Prior Art

Generaly, in an observation of the inside of a body by an endoscope, the focusing is effected by adjusting the position of an objective lens system by rotating a focus adjusting ring arranged outside of the body. In this case, it is desirable to effect the focusing rapidly from the necessity to end the observation and photographing as fast as possible in consideration of the pain of a patient when an endoscope optical system is inserted inside of his body. However, because of the necessity of frequent focusing in spite of a large depth of focus of the objective lens owing to the unevenness of the surface of the object to be observed and accordingly owing to the frequent changing of the observing position, the time and the work needed for focusing are very troublesome for the patient as well as for the operator. Therefore, it has been proposed to provide an endoscope having an automatic focus detecting mechanism. However, in conventonal endoscopes, a light receiving device of a focus detecting mechanism is arranged on the objective lens side in respect of an image guide (an optical fiber bundle for image transmission). Therefore, there is a merit enabling a stereoscopic vision, double image coinciding method or the like, but, on the other hand, there is a problem that the endoscope would be bulky and complicated manufacture.

SUMMARY OF THE INVENTION

The primary object of this invention is to provide an endoscope which is slim as a whole and simple to manufacture in spite of an automatic focus detecting mechanism arranged therein.

Another object of this invention is to provide an endoscope having an automatic focus detecting mechanism so arranged that the net pattern produced on the exit end face of an image guide by an optical fiber bundle will not obstruct the focus detection.

These and other objects of the present invention will become more apparent during the course of the following detailed description and appended claims.

BRIEF DESCRIPTION OF THE DRAWINGS

FIG. 1 is a view showing an endoscope optical system equipped with an embodiment of the automatic focus detecting mechanism according to the present invention;

FIGS. 2A and 2B are an elevational view and sectional view of the light receiving device used in another embodiment;

FIG. 3 is an elevational view showing an example of the optical filter used in the embodiment shown in FIG. 1; and FIG. 4 is a chart showing the characterisitics of the optical filter shown in FIG. 3.

DESCRIPTION OF THE PREFERRED EMBODIMENTS

Referring to FIG. 1, the reference numeral 1 denotes an objective lens arranged slidably on an optical axis O at the tip part of an endoscope, 2 denotes an image guide consisting of an optical fiber bundle, 3 denotes an image forming lens, and 4 denotes an eyepiece. In the focused state, the light from an object P to be observed will form an image on an entrance end face 2a of the image guide 2 by the objective lens 1 and the image emerged on an exit end face 2b of the image guide 2 will be able to be observed by an operator through the image forming lens 3 and the eyepiece 4. 5 denotes a half mirror arranged between the image forming lens 3 and eyepiece 4, 6 denotes an image forming lens, 7 denotes a light receiving device consisting of a plurality of micro light receiving elements such as CCD or photodiode arrays, 8 denotes an operation circuit i.e. a computing means to compute MTF (i.e. the modulation transfer function, a standard index to measure the contrast of an image of an object of the amplitude 1) and to control a driving device 9 for moving the objective lens 1. A part of the light from the image emerged on the exit end face 2b of the light guide 2 will be reflected by the half mirror 5, will form an image on the light receiving face of the light receiving device 7 by the image forming lenses 3 and 6, will be converted into an image signal by the light receiving device 7 and its electric MTF will be computed by the operation circuit 8 and, in response to thus computed value, the objective lens 1 will be moved through the objective lens driving device 9. This operation will be repeated. By the way, since the objective lens 1 of the endoscope has generally a large depth of focus, the zone focus system is adopted here.

The automatic focus detecting mechanism for endoscopes according to this invention is formed as described above. Therefore, when the focusing is to be performed, the objective lens 1 will be advanced an initial increment by the objective lens driving device 9 and the MTF of the image of the object P at that moment will be computed by the operation circuit 8, and, in case that this MTF if inferior to the former MTF, the objective lens 1 will be retracted by two steps and, from that position, the objective lens 1 will be moved step by step comparing the subsequent MTF with the former MTF and will be stopped after making the retroceding step in which the subsequent MTF becomes inferior to the former MTF. In this way, the focusing will be completed when the objective lens 1 is stopped at the best position. In this automatic focus detecting mechanism, as the light receiving device 7 is arranged on the side of the eyepiece 4 in respect of the image guide 2, it is possible to keep the endoscope slim and simple to manufacture.

In place of the above mentioned embodiment, the diameter of the end face of the image guide 2, as shown in FIGS. 2A and 2B, may be made large and arranged with the light receiving device 10 in a ring-shape near the peripheral edge part of the exit end face 2b of the image guide 2 leaving the visual field necessary for the image to be formed to compute the MTF of the output of this light receiving device 10. Further, the focusing may be performed by projecting a certain index on the object P to be observed through a part of the image guide 2 and the objective lens 1 reforming this projected index image on the entrance end face 2a of the image guide 2 through the objective lens 1 and computing the MTF of the index image emerged on the exit end face 2b of the image guide 2. In this case, the computing of the MTF will be done easily by using a sinusoidal wave grating as the index.

In the first embodiment described in reference with FIG. 1, the image of the net pattern of the optical fiber bundle emerged on the exit end face 2b of the image guide 2 would be formed on the light receiving device 7 regardless of the position of the objective lens 1 to obstruct the focus detection. To delete this pattern, an optical filter 11 having a plurality of openings 11a capable of lowering the MTF of the spatial frequency of the net pattern of the light guide 2, as shown in FIG. 3, may be arranged at any position, except the neighbourhood of the image plane, in the optical system comprising the objective lens 1, image guide 2, image forming lens 3, half mirror 5, image forming lens 6 and light receiving device 7 shown in FIG. 1. This utilizes the phenomenon that the MTF of a specific spatial frequency can be lowered, as shown in FIG. 4, due to the diffraction by a ring-shaped opening or a plurality of openings arranged near to the pupil of the lens system.

Instead of the above mentioned filter 11, an optical filter consisting of two parts capable of transmitting light and of giving a phase difference of wavelength by ½ or an odd multiple of ½ it between the two light bundles passed through the two parts of the filter may be used. In this case, the loss of light amount is small. Further, as a method to delete the net pattern of the image guide 2, an electric filter capable of cutting off the part of the frequency corresponding to the spatial frequency of the net pattern from the electric signal produced by the light receiving device 7 may be arranged 11' between the light receiving device 7 and the operation circuit 8 instead of the optical filter.

We claim:

1. In an endoscope comprising an objective lens system movable along an optical axis, an image-transmittimg optical fiber bundle having an entrance end face faced towards said objective lens system, and an eyepiece lens system faced towards an exit end face of said image-transmitting optical fiber bundle,
   an automatic focus detecting mechanism, comprising:
   a light-receiving device comprising a plurality of light-receiving elements capable of receiving a part of the light projected from the exit end face of said image-transmitting optical fiber bundle;
   a computing means connected to said light-receiving device and capable of computing the modulation transfer function of an object image transmitted by said image-transmitting optical fiber bundle from a picture signal obtained by said light-receiving device; and
   a driving device electrically connected to said computing means and being operatively coupled to said objectie lens sytem; said objective lens system being constructed and arranged to be moved by said driving device to maximize said modulation transfer function.

2. An automatic focus-detecting mechanism according to claim 1, wherein:
   said light-receiving device is arranged in association with said eyepiece lens system.

3. An automatic focus-detecting mechanism according to claim 1, wherein:
   said light-receiving device is arranged around the peripheral edge of the exit end face of said image-transmitting optical fiber bundle.

4. An automatic focus-detecting mechanism according to claim 1, further comprising:
   an optical filter having therein a plurality of openings constructed and arranged to lower the modulation transfer function of the spatial frequency of a net pattern on the exit end face of said image-transmitting optical fiber bundle.

5. An automatic focus-detecting mechanism according to claim 1, further comprising:
   an optical filter having two parts which are constructed and arranged to transmit light and which are so formed that the light bundle passsed through one of said two parts of said filter has a phase difference of wavelength by an odd integer multiple of ½ upon the light bundle passed through the other, to lower the modification transfer function of the spatial frequency of the net pattern on the exit end face of said image-transmitting optical fiber bundle.

6. An automatic focus detecting mechanism according to claim 1, further comprising:
   an electric filter connected to said light-receiving device and to said computing means and being capable of cutting-off the part of the frequency corresponding to the spatial frequency of said net pattern from an electrical signal obtained by said light-receiving device.

* * * * *